United States Patent [19]
Chen, Sr. et al.

[11] Patent Number: 5,695,710
[45] Date of Patent: Dec. 9, 1997

[54] TRANSESTERIFIED PET/PEN VIA MELT EXTRUSION

[75] Inventors: Paul N. Chen, Sr., Gillette; Kenith P. Music, Flemington, both of N.J.; Gerald W. McNeely, Spartanburg, S.C.

[73] Assignee: Hoechst Celanese Corp., Somerville, N.J.

[21] Appl. No.: 437,826

[22] Filed: May 9, 1995

[51] Int. Cl.[6] .................................................. B29C 49/06
[52] U.S. Cl. ...................... 264/532; 264/537; 428/36.92
[58] Field of Search ........................ 264/523, 532, 264/537, 540; 525/444, 445, 447; 428/36.92, 542.8

[56] References Cited

U.S. PATENT DOCUMENTS

| | | | |
|---|---|---|---|
| 3,546,320 | 12/1970 | Duling et al. | 525/444 |
| 5,006,613 | 4/1991 | Shepherd et al. | |
| 5,250,333 | 10/1993 | McNeely et al. | |

FOREIGN PATENT DOCUMENTS 4-168148  6/1992  Japan.

OTHER PUBLICATIONS

Database WPI, Sect. Ch, Week 9421, Derwent Pubs. Ltd., London, GB; Class A23, AN 92-335782 XP002006281 & JP,A,04 239 624 (Teijin Ltd), 27 Aug. 1992.

Database WPI, Sect. Ch, Week 9114, Derwent Pubs. Ltd., London, GB; Class A23, AN 91-098663 XP002006282 & JP,A,03 043 425 (Teijin KK), 25 Feb. 1991.

Databse WPI, Sect. Ch, Week 9241 Derwent Pubs. Ltd., London, GB; Class A23, AN 92-335783 XP002006283 & JP,A,04 239 625 (Teijin Ltd), 27 Aug. 1992.

Colloid & Polymer Science, vol.272, No.11, 1994; pp. 1352–1362, XP000574275 Andresen E et al: "Studies of Miscibility, Transesterification & Crystallization in Blends of Poly(ethyleneterephthalate) & Poly(ethylene–2,6–Naphthalene Dicarboxylate)".

Mark E. Stewart, A. James Cox, and D. Mark Naylor "Reactive processing of poly(ethylene 2,6–naphthalene dicarboxylate)/poly(ethylene terephthalate) blends" Jan. 1993, pp. 4060–4067, Polymer, 1993, vol. 34, No. 19.

Mark E. Stewart, A. James Cox, and D. Mark Naylor "Transesterification of poly(ethylene 2,6–napthalene Dicarboxylate)/Poly (Ethylene Terephthalate) Blends" pp. 1222–1226, ANTEC '93.

Anonymous, "Article No. 28340", Research Disclosure, Nov. 1987.

*Primary Examiner*—Catherine Timm
*Attorney, Agent, or Firm*—Palaiyur S. Kalyanaraman

[57] ABSTRACT

A process for making a transparent blow molded product made of a copolyester of PET and PEN that does not thermally deform at temperatures up to 85–87 C., and the product of that process, especially a transparent blow molded bottle. The copolyester is made by transesterifying a 20/80 (w/w) PEN/PET via melt extrusion at a temperature of from about 250 C. to about 290 C. for a time sufficient to produce about 1–20% transesterification of said polymers, forming a copolymer. The copolyester is then injection molded at a temperature of from 290 C. to about 320 C. to form a transparent preform in which the copolymer has a glass transition temperature of about 85 C. or higher and a melting point temperature of at least about 225 C. The copolymer is then thermo-stretch blow molded to form a transparent product.

3 Claims, 8 Drawing Sheets

TRANSESTERIFIED PET/PEN VIA MELT EXTRUSION

BACKGROUND OF THE INVENTION

This invention relates to copolymers of poly(ethylene terephthalate) ("PET") and poly(ethylene naphthalene 2,6-dicarboxylate) ("PEN") and processes for making these copolymers by transesterifying PET and PEN, especially via melt extrusion.

PET is a very common material for packaging applications due to its good barrier properties, relative low cost and weight, toughness, and ability to form transparent films, bottles, and other packaging materials. For example, PET is widely used for making bottles for soft drinks, providing a lightweight alternative to glass.

To enhance the barrier properties, it is desirable for the polymer to have some amount of crystallinity; crystalline polymers generally have better barrier properties (e.g., lower oxygen permeability) than amorphous polymers. Crystallinity also enhances the strength and washability of polymers. At the same time, transparency is commercially desirable in many applications. Common PET blow molded soft drink bottles are transparent, but have sufficient crystalline character to enhance barrier properties, strength and washability. Such a polymer exhibits a glass transition temperature ("$T_g$") due to its amorphous phase as well as a melting point ("$T_m$") at a higher temperature due to its crystalline phase. The $T_g$ places a practical upper limit on use temperatures.

One drawback of PET is its relatively low glass transition temperature of about 75–78 C., which limits the temperature at which a PET bottle can be filled with liquid without deforming. Therefore, for liquids that are bottled hot, glass and metal containers are often used where PET is unsuitable.

Compared to PET, PEN has a higher glass transition temperature (about 119–124 C.) and superior barrier properties, e.g., lower permeability to oxygen. PEN would be a very useful material for bottling applications, including hot liquid bottling; unfortunately, the price of PEN is not competitive with alternative bottling materials.

Blends and copolymers of PEN and PET have been made in an attempt to provide a material that is cheaper than PEN but has a higher glass transition temperature and better barrier properties than PET. Unfortunately, a cost-competitive PET/PEN material having a sufficiently high glass transition temperature for hot fill applications has not been reported.

Shepherd et al. (U.S. Pat No. 5,006,613) described a tricomponent blend of PET, PEN, and a compatibilizing amount of a copolyester that produced transparent packaging suitable for hot fill applications.

McNeely et al. (U.S. Pat. No. 5,250,333) describes a modified PET in which alkoxylated polyol is incorporated. Units derived from 2,6-naphthalenecarboxylic acid may be incorporated for hot fill applications.

In two articles entitled, "TRANSESTERIFICATION OF POLY(ETHYLENE NAPHTHALENE 2,6-DICARBOXYLATE)/POLY(ETHYLENE TEREPHTHALATE) BLENDS", *ANTEC '93*, pp. 1222–27 (1993), and Reactive processing of poly(ethylene 2,6-naphthalene dicarboxylate)/poly(ethylene terephthalate) blends, *POLYMER*, 1993, Vol. 34, No. 19, pp. 4060–4067, Stewart et al. describe blends of PET (containing varying amounts of catalyst(s)) and PEN made by melt mixing the polymers in an extruder at temperatures from 548–588 K (275–315 C.) to produce varying amounts of transesterification. The PEN content of these blends was 80%, 65%, and 50%. It was reported that the degree of transesterification increased as the melt mixing temperature increased, and also as the melt mixing time increased. Stewart et al. further reported that the $T_g$ increased as PEN content increased.

In an anonymous article numbered 28340 in *RESEARCH DISCLOSURE*, November 1987, melt blends of PEN and PET were disclosed, especially 25%, 50%, and 75% PET blends. The data in that reference suggests that the $T_g$ for a 20/80 PEN/PET blend is well below 85 C.

SUMMARY OF THE INVENTION

The present invention is a process for making a transparent blow molded product made of a copolyester that does not thermally deform at temperatures up to at least 85 C., said process comprising:

- melt extruding about four parts by weight poly(ethylene terephthalate) together with one part by weight poly (ethylene naphthalene 2,6-dicarboxylate) at a temperature of from about 250 C. to about 290 C. for a time sufficient to produce about 1–20% transesterification of said polymers as measured by NMR (nuclear magnetic resonance spectroscopy), forming a copolymer;
- injection molding said copolymer at a temperature of from 290 C. to about 320 C. for three minutes or less to form a transparent preform in which said copolymer has a glass transition temperature of about 85 C. or higher and a melting point above about 225 C.;
- thermo-stretch blow molding said preform at a temperature between said glass transition temperature and the crystallization temperature of the copolymer to form a transparent polyester product having a glass transition temperature of at least 85 C., a melting point of at least 225 C., and a heat of fusion of at least 20 J/g as measured by DSC (differential scanning calorimetry).

The present invention also includes the product of said process.

It is an object of the present invention to provide a transparent blow molded product, such as a bottle, made of a copolymer having a glass transition temperature of at least 85–87 C. that is formed by transesterifying a blend of 80% PET and 20% PEN by weight.

It is also an object of the present invention to provide a relatively inexpensive, transparent polyester bottle having good barrier properties that is suitable for hot fill applications.

It is a further object of the present invention to provide a process for making a transparent bottle or other blow molded product made of a copolymer, having a glass transition temperature of at least 85–87 C. and a heat of fusion of at least about 20 J/g, that is formed by transesterifying a blend of 80% PET and 20% PEN by weight.

It is another object of the present invention to provide a process for transesterifying a blend of 80% PET and 20% PEN by weight to a level of 1–20% transesterification to form a block copolymer, as measured by NMR, and blow molding the copolymer to form a transparent, partly crystalline container or other object that does not thermally deform at temperatures below 85 C.

Other objects and advantages of the present invention will be apparent to those skilled in the art from the following description and the appended claims.

DETAILED DESCRIPTION OF THE PREFERRED EMBODIMENTS

Figure 1:
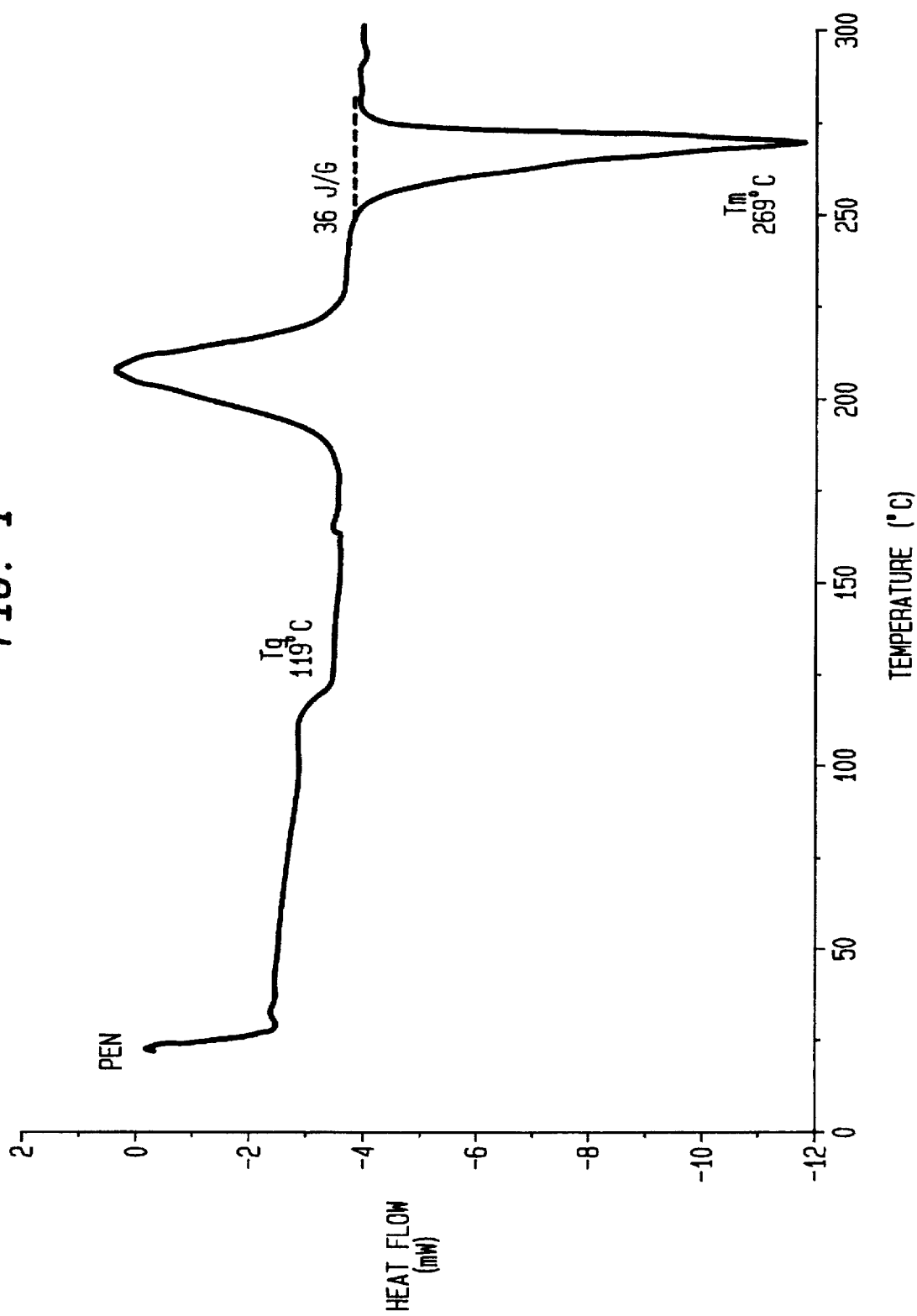
FIG. 1 shows the results of a DSC analysis of PEN used in the present invention.

In one preferred embodiment of the present invention, PET and PEN are melt extruded together in a PEN:PET weight ratio of 20:80 using a twin screw extruder at temperatures in the approximate range of 250–290 C., preferably 250–280 C., and most preferably 265–275 C., to form opaque pellets. The polymers must be heated in the extruder at such temperatures for a time sufficient to produce a low degree of transesterification, i.e., 1–20% transesterification and preferably no more than 15%.

This produces an opaque copolymer having a $T_g$ that is about 85–87 C., and having a degree of crystallinity reflected by the existence of a $T_m$ and a heat of fusion of at least about 20 Joules/gram ("J/g"). At this stage, it is preferred that the copolymer have two melting points in the range of 240–270 C., approximately corresponding to the melting points of PET and PEN, and a heat of fusion greater than 30 J/g. This copolymer is believed to comprise alternating blocks or strings of PET and PEN units; such a copolymer is commonly referred to as a block copolymer.

The extrusion speed or polymer throughput rate is inversely proportional to the residence time of the polymers in the extruder. If the speed is relatively low and the temperature is relatively high a greater degree of transesterification will occur, resulting in a more random copolymer having a lower degree of crystallinity, whereas a lower extrusion temperature and faster speed will cause less transesterification and thus less randomness in the copolymer. Extrusion can be carried out temperatures somewhat higher than 290 C. if the extruder residence time is shortened sufficiently to prevent over-transesterification; however, temperatures in the range of 250–280 C. are preferable.

The percent transesterification of PEN/PET copolymers set forth herein is measured according to the method described by Stewart, et at., in *POLYMER*, 1993, Vol. 34, No. 19, pp. 4060–4067. In general, a sample of the copolymer is dissolved in a solvent mixture of 70/30 wt % deuterated chloroform and trifluoroacetic acid by weight. A proton nuclear magnetic resonance ("NMR") spectrum of this copolymer solution is made. The NMR spectrum contains peaks that indicate the nuclear environment of the hydrogen atoms in the ethylene glycol monomer unit ("EG"), which differs depending on whether the EG is bonded to two terephthalate units ("T"), two naphthalate units ("N"), or one T and one N. A different peak corresponds to each of the three possible monomer unit sequences, i.e. the sequences T-EG-T, T-EG-N or N-EG-N. Transesterification produces the T-EG-N sequence, so the size of this peak indicates the degree or percentage of transesterification; for 0% transesterification, there is no peak for the T-EG-N sequence. A random copolymer is 100% transesterified. The transesterification percentage is calculated by comparing the relative areas of the three peaks to that of a theoretical random copolymer of the same overall composition to arrive at a mole percent transesterification.

A random 20/80 PEN/PET copolymer has a significantly lower melting point, i.e. about 212 C., and a much lower heat of fusion (lower crystalline character), i.e. about 6 J/g, than the block copolymer produced in the process of this invention. Such a copolymer does not exhibit the high barrier properties (e.g., low oxygen permeability) or the strength of the block copolymer described herein. Therefore, it is important to carefully control the amount of transesterification of the copolymer.

The degree of transesterification of the copolymer can be controlled by selecting an appropriate combination of extrusion temperature and time. One skilled in the art will readily be able to select suitable temperature-time combinations to achieve the desired level of transesterification based on the description and examples provided herein.

The melt extruded copolymer is then injection molded to form a preform at a temperature of about 290–320 C., preferably about 300–310 C., for no more than about three minutes, preferably one minute or less. The time and temperature must be limited because excessive heating at this stage could undesirably increase the amount of transesterification.

The injection molded preform of the present invention has a $T_g$ of at least 85 C., typically about 85–87 C., is transparent to visible light, and has a $T_m$ above 225 C.; typically, the $T_m$ is about 230–240 C.

The preform is thermo-stretch blow molded at a temperature in the range between the $T_g$ and the crystallization temperature of the copolymer, typically in the approximate range of 100–140 C., preferably in the approximate range of 100–120 C. The temperature must be above the $T_g$ so that the copolymer will flow and stretch, but must be below the temperature at which additional crystallization of the copolymer (the crystallization temperature) will occur to avoid introducing haziness into the material.

This process turns the preform into the final blow molded article, e.g., a bottle. The article is: transparent to visible light; exhibits a $T_g$ of at least 85 C., preferably 87 C.; has a $T_m$ of at least 225 C., preferably at least about 230 C.; and has a heat of fusion as measured by DSC of at least 20–30 J/g. The heat of fusion reflects the fact that the block copolymer of this invention is at least 3–4 times more crystalline than a random copolymer of 20/80 PEN/PET; preferably, it is more than 4 times more crystalline. This product will exhibit superior barrier properties compared to PET products, suitable for packaging or bottling applications, and can be filled at higher temperatures than PET products because it has a higher $T_g$.

The following non-limiting examples illustrate several specific embodiments of the present invention.

EXAMPLE I

Figure 2:
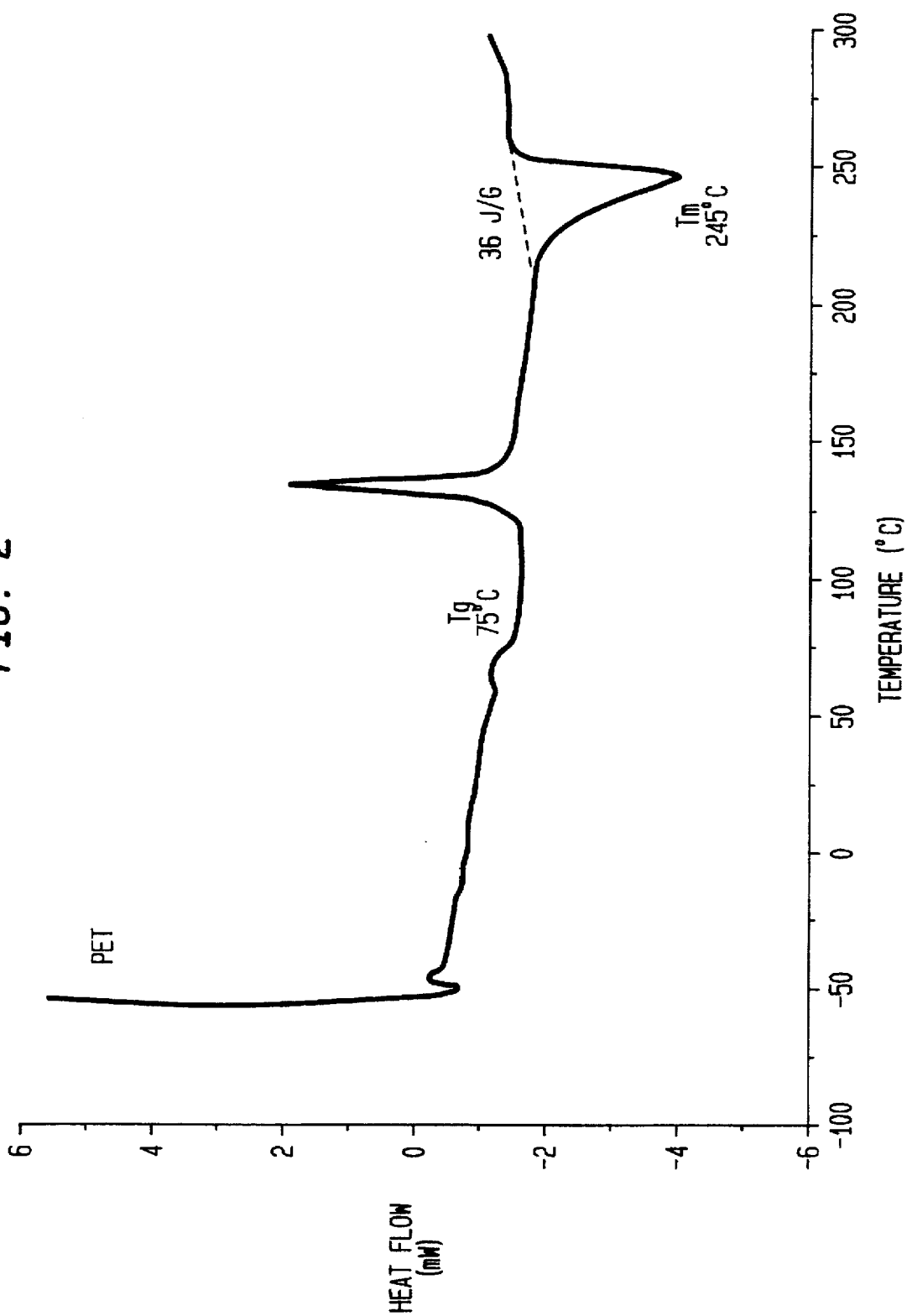
FIG. 2 shows the results of a DSC analysis of PET used in the present invention.

A total of 110 pounds of a blend of 20% PEN and 80% PET by weight were compounded at 275 C. and a screw speed of 40 rpm in a Brabender PL2000 conical twin screw extruder. The measured inherent viscosity, $T_g$, and $T_m$, of the polymers were: 0.6, 119 C., and 269 C. for PEN (see FIG. 1); and, 0.9, 75 C., and 245 C. for PET (see FIG. 2).

The blend material extruded and pelletized well. 100 pounds of good quality opaque pellets were produced. These pellets were dried at 120 C. for 16 hours in preparation for molding.

EXAMPLE II

The procedure of Example I was followed again except that the extrusion was carried out at 290 C. The result was 100 pounds of good quality opaque pellets. These pellets were dried at 120 C. for 16 hours in preparation for molding.

EXAMPLE III

The procedure of Example I was followed again except that the extrusion was carried out at 260 C. The result was 100 pounds of good quality opaque pellets. These pellets were dried at 120 C. for 16 hours in preparation for molding.

COMPARATIVE EXAMPLE I

The procedure of Example I was carried out at 310 C. and 20 rpm on 45 pounds of blend material, resulting in 40 pounds of clear pellets having non-uniform quality.

COMPARATIVE EXAMPLE II

Figure 3:
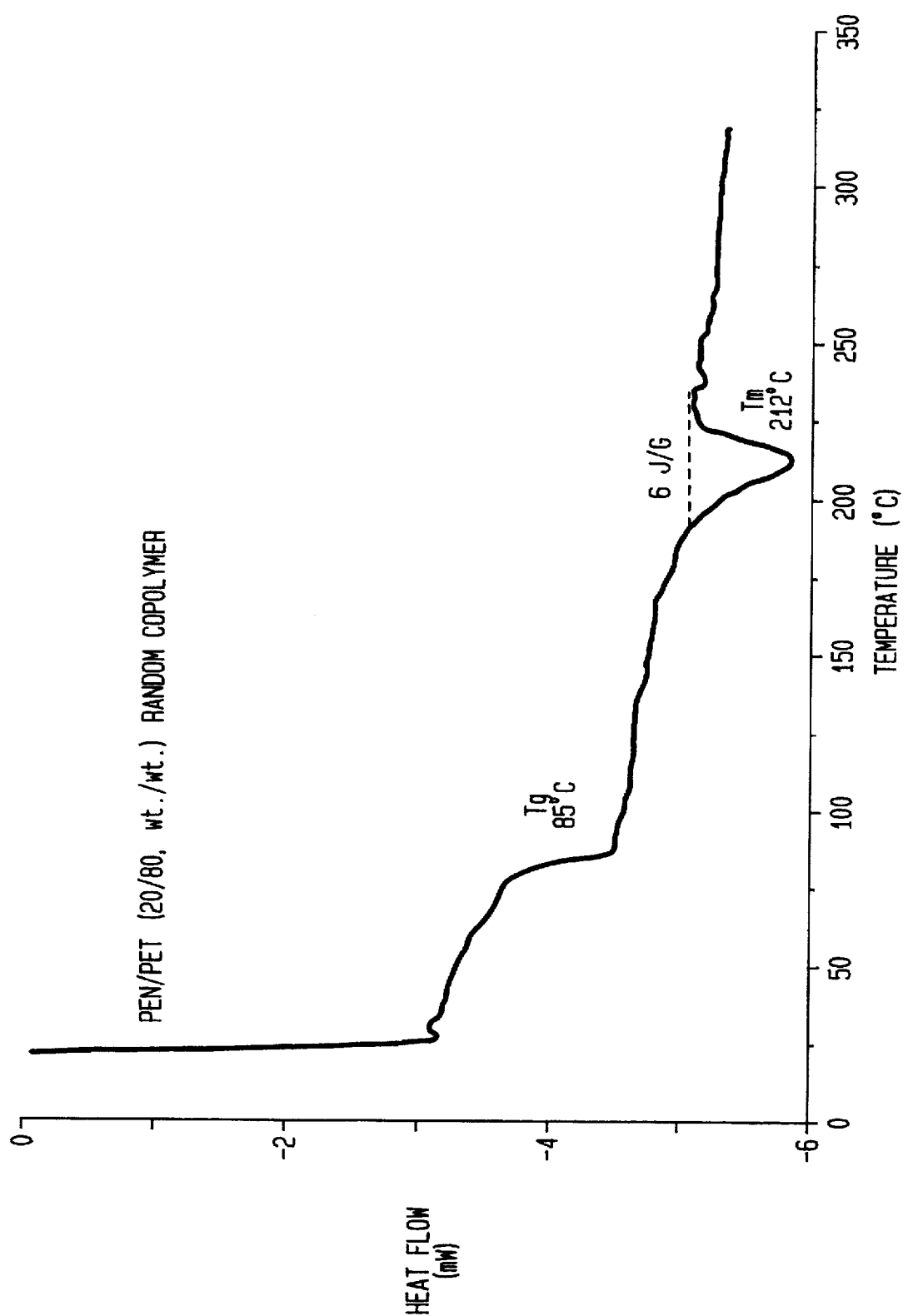
FIG. 3 shows the results of a DSC analysis of a random 20/80 weight % PEN/PET.

A random 20/80 (w/w) PEN/PET copolymer was synthesized from the monomers ethylene glycol, terephthalic acid, and dimethyl-2,6-naphthalene dicarboxylate. The copolymer had very low crystallinity, exhibiting a melting point at 212 C. and a heat of fusion of 6 J/g, as measured by DSC (see FIG. 3).

EXAMPLE IV

The pellets made by the procedure of Example I were injection molded to make preforms for a two-liter plastic bottle. A 150 ton Cincinnati/Milacron injection molder was used at a screw speed of 5000 rpm and temperatures of 277 C., 293 C., 299 C., and 310 C. The preforms formed at 310 C. was clear, whereas the preforms made at 277 C. was opaque and the other two were hazy.

EXAMPLE V

The clear preforms made at 3 10 C. by the procedure of Example IV were thermo-blow molded into two-liter bottles using a Cincinnati/Milacron blow molding unit. The unit has a heating chamber through which the preform is drawn back and forth for a preset period of time; usually, this heating cycle lasts about 3 minutes. At the end of the heating cycle the preform is drawn out of the chamber and rotated for about 10–15 seconds (the equilibration cycle). Then a bottle mold closes around the preform and nitrogen gas is blown in and expands the preform to form a bottle; this blow cycle lasts about 7 seconds.

The preforms were blow molded under the following conditions: heating cycle of 3.40 minutes; equilibration of 15 seconds; heating temperature in the approximate range of 100–120 C.

Figure 4:
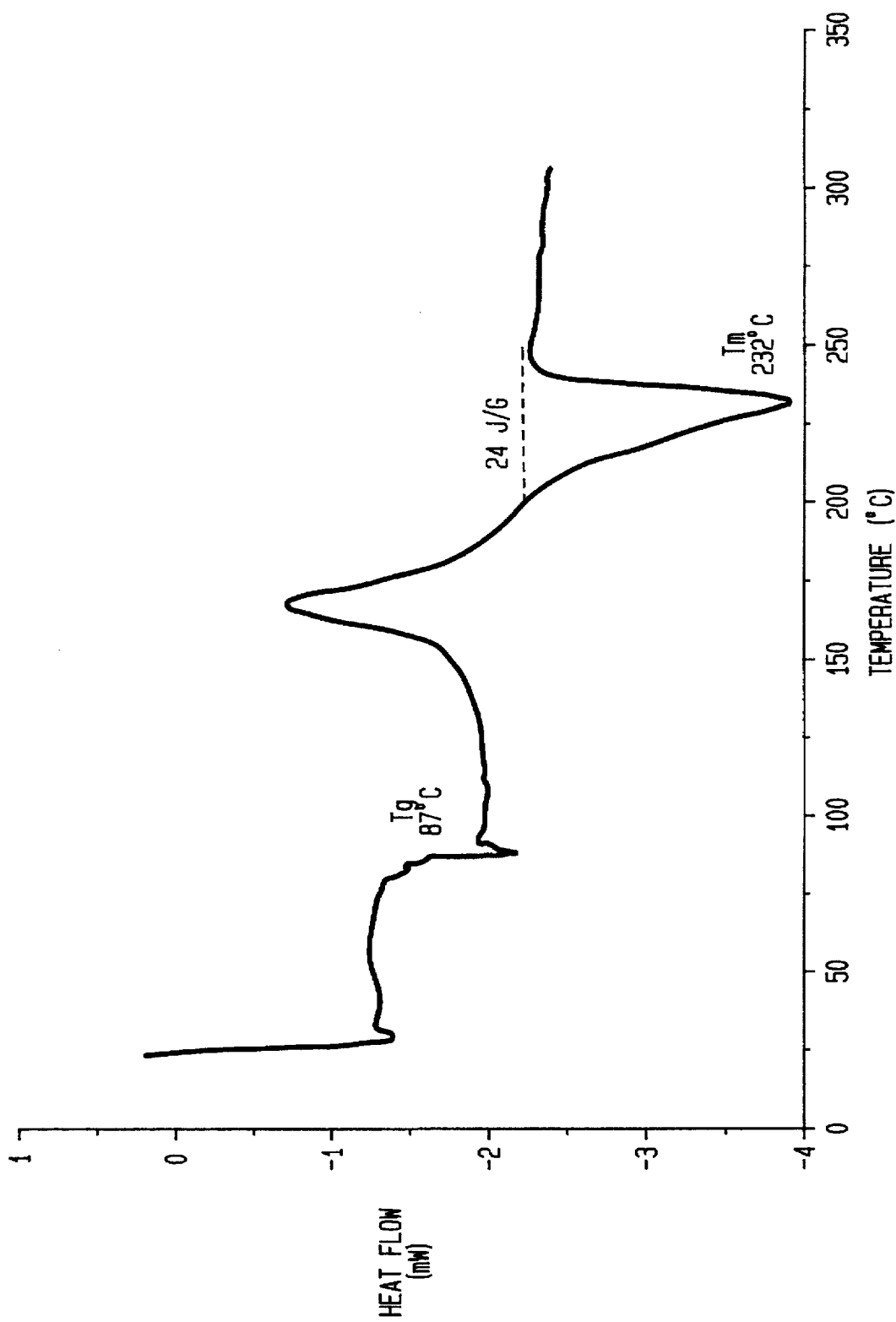
FIG. 4 shows the results of a DSC analysis of a preform made according to the present invention.
Figure 5:
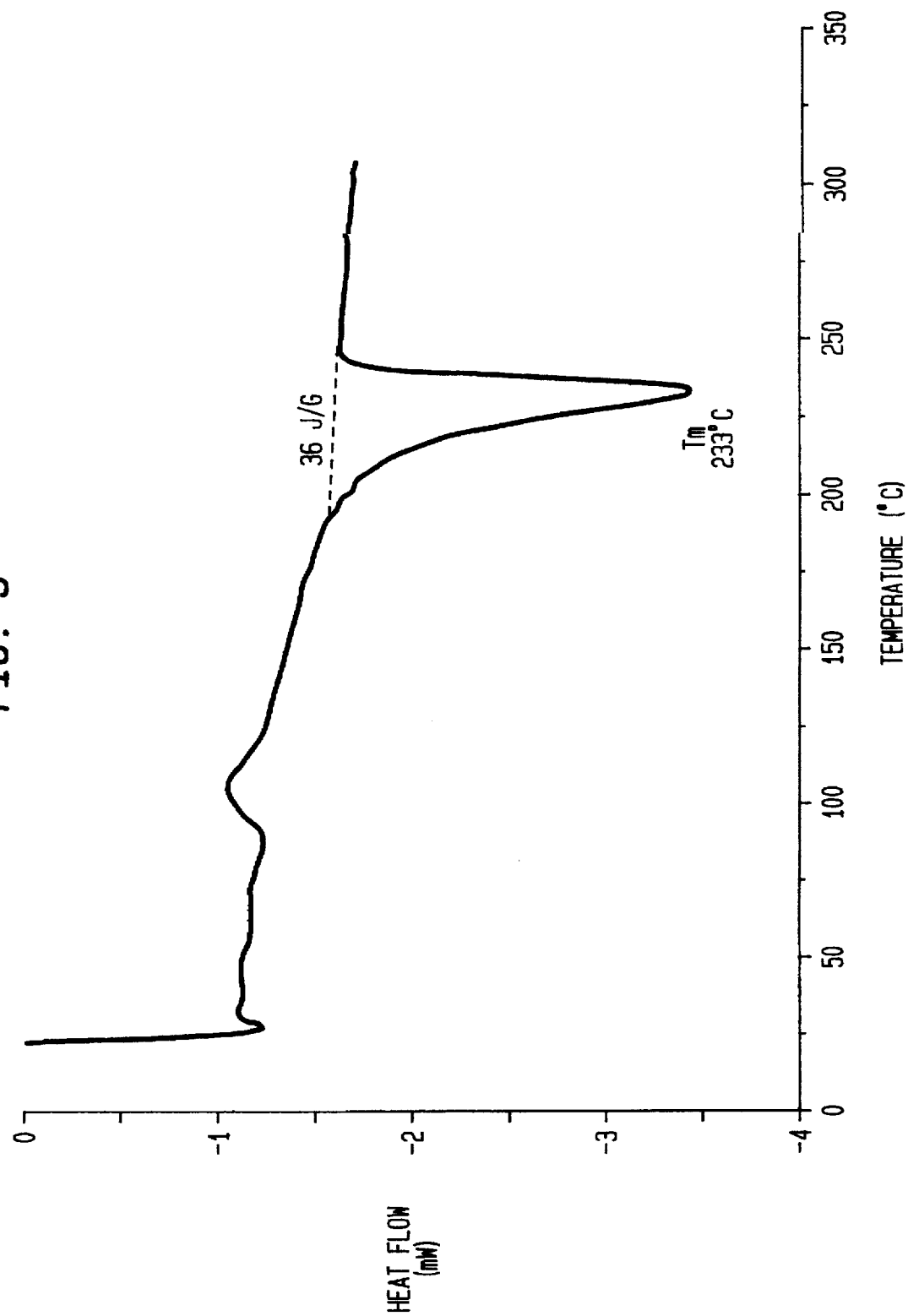
FIG. 5 shows the results of a DSC analysis of the neck of a blow molded bottle made according to the present invention.
Figure 6:
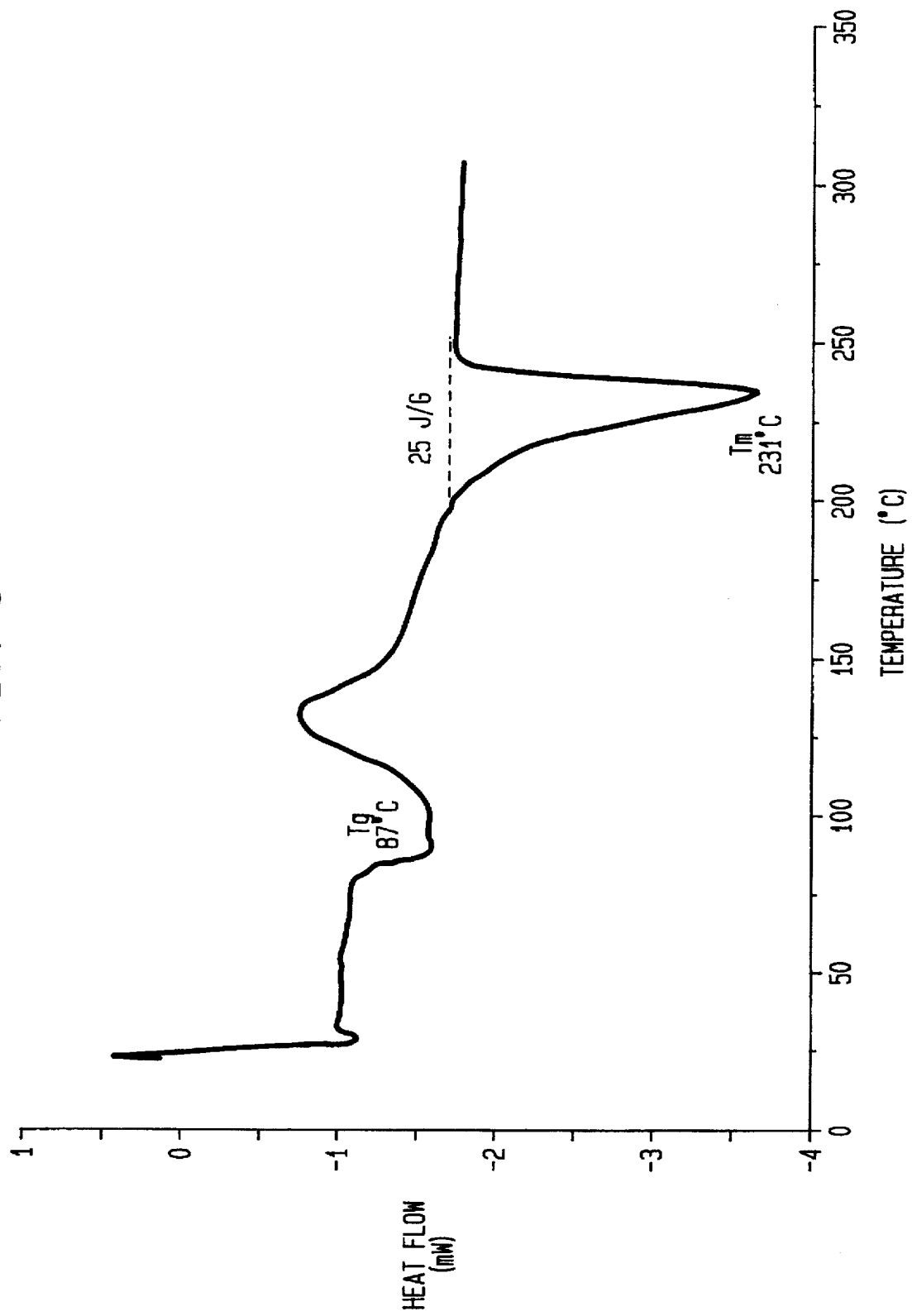
FIG. 6 shows the results of a DSC analysis of the bottom portion of a blow molded bottle made according to the present invention.

FIG. 4 shows the results of a DSC analysis of a clear preform made according to Example IV, and FIGS. 5–6 show the DSC analyses of the neck and bottom portions, respectively, of a bottle blown therefrom. These results show that the preform and bottle both had a $T_g$ of 87 C., a $T_m$ of about 321 C., and a heat of fusion of about 24–25 J/g.

EXAMPLE VI

Melt extrusion was carried out on the same blend and with the same extruder as in Example I to compare pellets made at different temperatures and screw speeds. The results are shown in Table 1:

TABLE 1

Appearance of Pellets Extruded Under Different Conditions

| Screw Speed | Extruder Temperature (C.) | | |
|---|---|---|---|
| (rpm) | 260 | 280 | 300 |
| 30 | Opaque | Haze | Clear |
| 120 | — | Opaque | Opaque |

Figure 7:
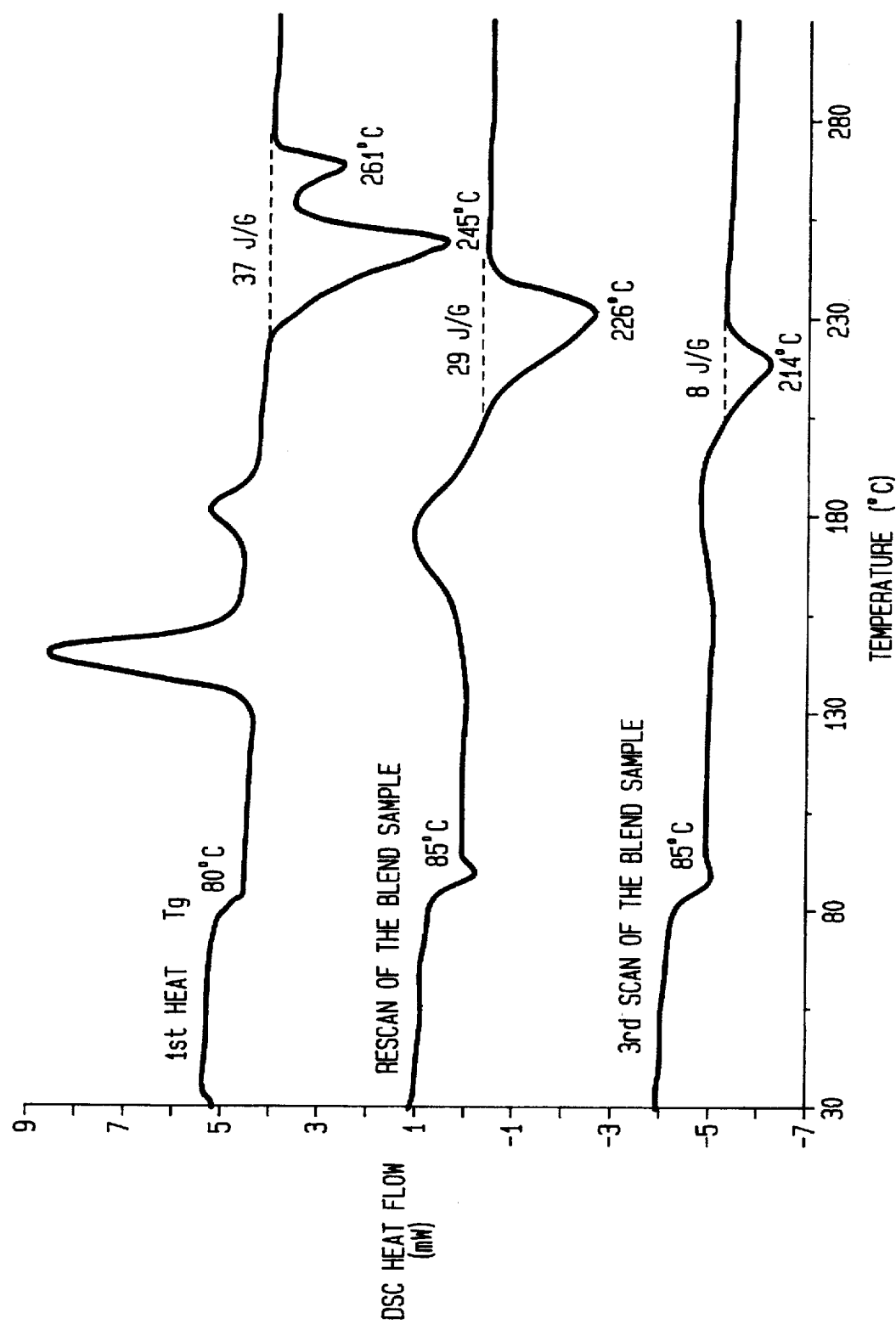
FIG. 7 shows the results of three consecutive DSC analyses of a particular 20/80 PEN/PET copolymer made according to the present invention.

FIG. 7 shows the results of three DSC analyses of the copolymer extruded at 260 C. and 30 rpm. The first analysis showed a $T_g$ of 80 C. and two $T_m$'s at 245 C. and 261 C., with a total heat of fusion of 37 J/g. The DSC heating continued to temperatures well above 300 C., which is believed to cause additional transesterification. Consequently, a reanalysis of the same material showed a $T_g$, $T_m$, and heat of fusion closer to that of the random copolymer (see FIG. 3). The third analysis showed that the melting point and heat of fusion had become almost identical to that of the random copolymer. These results verify that additional heating of the copolymer produces a more random copolymer having a lower degree of crystallinity.

Figure 8:
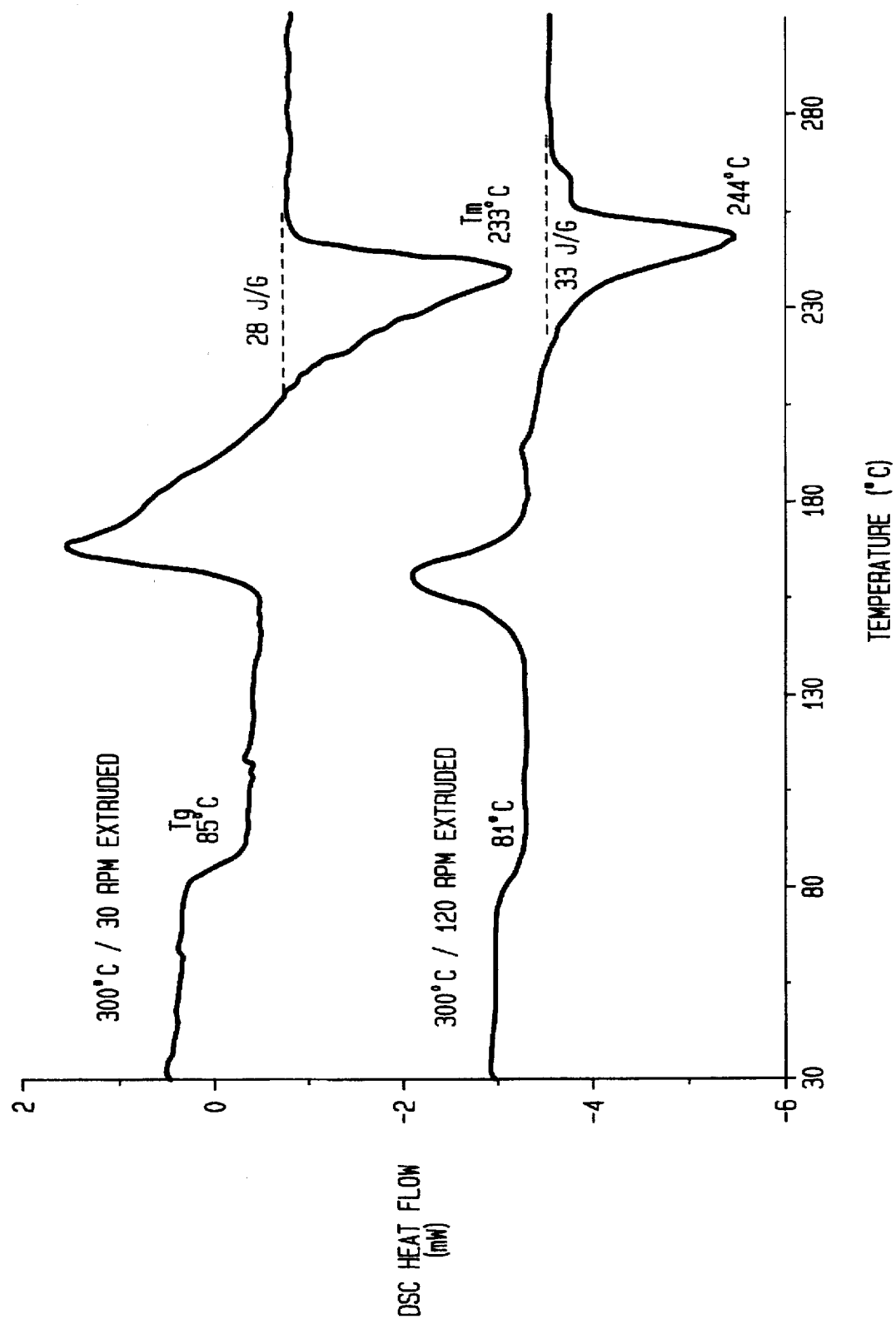
FIG. 8 shows the results of the DSC analysis of each of two 20/80 PEN/PET copolymers made under different conditions.

FIG. 8 shows the results of DSC analyses of the copolymers made at 300 C. The analysis of the copolymer extruded at 120 rpm (opaque pellets) is similar to the first analysis of the 260 C. in regard to the $T_g$, $T_m$, and heat of fusion; a double melting point peak can be seen, although the two peaks are less distinct than in FIG. 7. The analysis of the copolymer extruded at 30 rpm (clear pellets) is somewhat more similar to the second analysis of FIG. 7. These results provide evidence that the lower extrusion speed resulted in additional randomization (more transesterification) of the copolymer and reduced crystallinity. These results also suggest that if the extruder residence time, or melt mixing time, is sufficiently short, extrusion temperatures up to at least 300 C. could be used in the practice of the present invention; however, a temperature of about 260–280 C. is preferred.

EXAMPLE VII

Four 20/80 PEN/PET blends were prepared using the polymers of Example I and a small Brabender mixer with a 70 g capacity to check the relationship between transesterification and mixing time and temperature. The polymers were melt mixed at two temperatures, 280 C. and 300 C., for two different time periods, 3 and 5 minutes, at each temperature. The percent transesterification was measured by Fourier Transform NMR (using a 70/30 weight % mixture of chloroform/trifluoroacetic acid) for each of the four copolymers so produced. The results are presented in Table 2:

TABLE 2

Effect of Melt Mixing Time and Temperature

| Temp. (C.) | Time (min.) | % Transesterification |
|---|---|---|
| 280 | 3 | less than 15 |
| 280 | 5 | 17 |
| 300 | 3 | 20 |
| 300 | 5 | 57 |

The results in Table 2 show that the combination of high extrusion temperature (300 C.) and long extruder residence time at that temperature (5 min) produces an undesirable amount of transesterification.

Many variations of the present invention not illustrated herein will occur to those skilled in the art. The present invention is not limited to the embodiments illustrated and described herein, but encompasses all the subject matter within the scope of the appended claims.

We claim:

1. A process for making a transparent blow molded product made of a copolyester that does not thermally deform at temperatures below 85 C., said process comprising:

melt extruding about four parts by weight poly(ethylene terephthalate) together with one part by weight poly (ethylene naphthalene 2,6-dicarboxylate) at a temperature of from about 250 C. to about 290 C. for a time sufficient to produce about 1–20% transesterification of said polymers, to form a copolymer;

injection molding said copolymer at a temperature of from 290 C. to about 320 C. for no more than about three minutes to form a transparent preform in which said copolymer has a glass transition temperature of about 85 C. or higher, has a melting point of 225 C. or higher, and has a heat of fusion of 20 J/g or higher as measured by differential scanning calorimetry;

thermo-stretch blow molding said preform at a temperature between said glass transition temperature and the crystallization temperature of said copolymer to form a transparent product.

2. A process for making a transparent blow molded bottle made of a copolyester that does not thermally deform at temperatures below 85 C., said process comprising:

melt extruding about four parts by weight poly(ethylene terephthalate) together with one part by weight poly (ethylene naphthalene 2,6-dicarboxylate) at a temperature of from about 260 C. to about 280 C. for about 3–5 minutes, to form a copolymer;

injection molding said copolymer at a temperature of from 290 C. to about 320 C. for no more than three minutes to form a transparent preform in which said copolymer has a glass transition temperature of about 85 C. or higher and has a melting point of 225 C. or higher and a heat of fusion of at least 20 J/g;

thermo-stretch blow molding said preform at a temperature in the range of 100–120 C. to form a transparent bottle.

3. A process for making a transparent blow molded bottle made of a copolyester that does not thermally deform at temperatures below 85 C., said process comprising:

melt extruding about four parts by weight poly(ethylene terephthalate) together with one part by weight poly (ethylene naphthalene 2,6-dicarboxylate) at a temperature from about 280 C. to about 300 C. for no longer than about 3 minutes, to form a copolymer;

injection molding said copolymer at a temperature of from 290 C. to about 320 C. for no more than about one minute to form a transparent preform in which said copolymer has a glass transition temperature of about 85 C. or higher and has a melting point of 225 C. or higher and a heat of fusion of at least 20 J/g;

thermo-stretch blow molding said preform at a temperature in the range of 100–120 C. to form a transparent bottle.

* * * * *